INVENTORS.
GEORGE F. J. LEHNER
ERNEST C. BURKHART
RALPH E. BROWN
BY- Lynn Latta
—ATTORNEY—

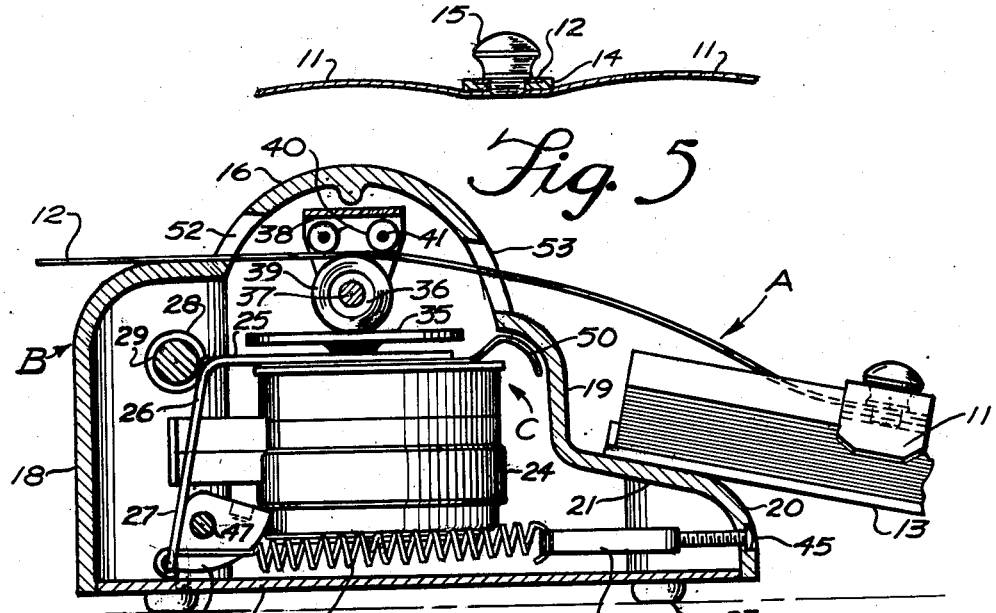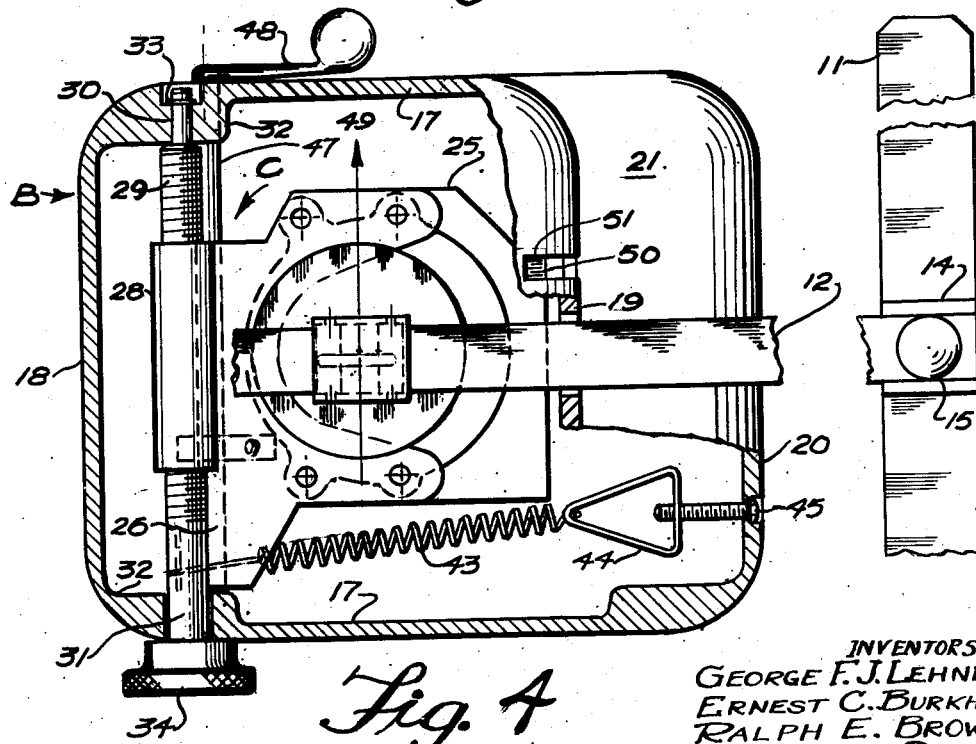

Patented Aug. 5, 1952

2,605,558

UNITED STATES PATENT OFFICE 2,605,558

READING PACER

George F. J. Lehner and Ralph E. Brown, Los Angeles, and Ernest C. Burkhart, Malibu, Calif., assignors, by direct and mesne assignments, to Benson-Lehner Corporation, Los Angeles, Calif., a corporation of California Application November 14, 1950, Serial No. 195,632

8 Claims. (Cl. 35—35)

This invention relates to a reading pacer, i. e., apparatus for moving a line guide downwardly over a page of printed material, to pace the reading of the material by an observer. The general object of the invention is to provide a machine adapted to effect power-driven, timed movement of a line guide along a printed page, at a rate which may be adjusted to meet the capacities of requirements of various readers.

A specific object is to provide such a pacer, capable of being adjusted for change of speed while in actual operation.

Another object is to provide a pacer having a relatively simple yet effective arrangement of line guide, operating shaft therefore, and drive mechanism, operative upon said shaft for moving the line guide at various speeds selected by adjustment of the drive mechanism. In this respect, the invention, in one of its more specific aspects, contemplates the utilization of a driving disc that is motor operated to drive a drive roller which, in turn, directly transmits, from its periphery, linear movement to the line guide operating shaft, the relative positions of drive disc and roller being shiftable in order to change the speed ratio of the drive between them.

Another object is to provide such a pacing apparatus having means for readily declutching the drive between the motor and the line guide shaft. As a specific arrangement for doing this, the invention contemplates a swinging mounting for the motor and the driving disc carried thereby, to provide for movement of the driving disc away from contact with the roller, together with a simple operator for shifting the motor and drive disc against the resistance of yielding means normally maintaining the driving engagement.

Another object is to provide a pacing mechanism having a speed adjustment coupled with indicator means for accurately indicating the speed to which the mechanism is adjusted.

A further object is to provide such a pacing mechanism having a fairly simple means for adjusting the line guide to papers and books of widely varying thickness, supported upon a support of fixed position. In this respect, the invention provides for a highly flexible operating shaft connecting the line guide to the driving mechanism, adapted to yield under the weight of the line guide so that the latter may rest lightly upon the surface of the printed sheet being traversed. Another object is to provide a pacing mechanism having a line guide and supporting shaft arranged for intimate contact of the line guide with the pages of a book, with the guide generally fitted to the transverse curvature of the book pages.

A further object is to provide a pacing mechanism affording a fixed support for the upper end of a book or page support, in combination with the other features referred to above.

Other objects will become apparent in the ensuing specifications and appended drawings in which:

Fig. 3 is a longitudinal vertical sectional view through the machine;

Fig. 4 is a plan view of the machine with the majority of the case broken away to illustrate the interior mechanism; and Fig. 5 is a detail sectional view taken longitudinally through the line guide.

Figure 1:
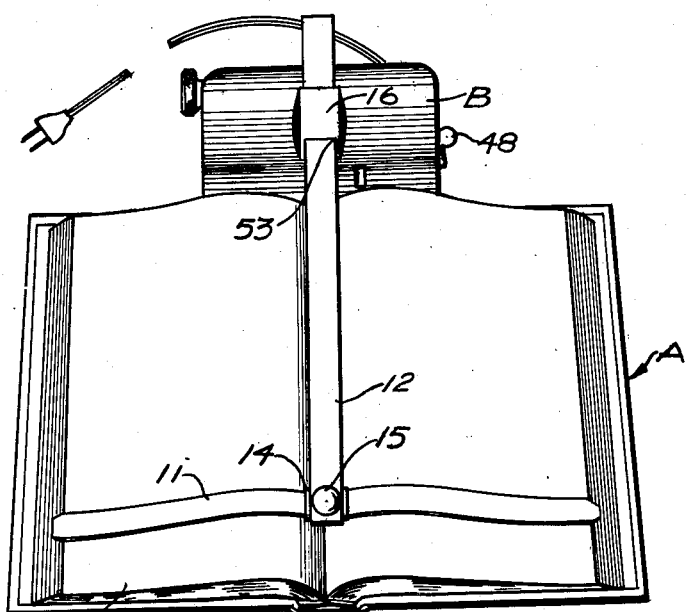
Fig. 1 is a perspective view of a pacing mechanism embodying my invention, shown in conjunction with an open book supported thereby and engaged by the line guide mechanism.

Referring now to the drawings in detail, I have shown therein as an example of one form in which the invention may be embodied, a pacing mechanism comprising generally a line guide unit A including a T-head 11 and a flexible stem 12 to one end of which it is secured. Head 11 and stem 12 may both be constructed of relatively thin ribbon metal, with some resiliency, spring metal being preferred. Guide head 11 is arched upwardly, outwardly and thence downwardly from each side of stem 12 as indicated in Fig. 5, so that its central portion will lie in the fold between the pages of an opened book 13, and will be guided therein as the line guide is moved from the top of the book to the bottom thereof. The arched shape of the guide head 11 conforms it generally to the curvature of the pages of the book, as indicated in Fig. 1. Stem 12 is secured to guide head 11 through the medium of a clip 14 having in its upper side a groove to snugly receive the outer end of stem 12, a screw 15 being extended through the end of stem 12 and threaded into clip 14, and the latter being secured as by welding or brazing to the upper face of the central web portion of head 11.

Mechanism for operating line guide A comprises generally a case B having drive mechanism C mounted therein. Case B may comprise a one-piece molded or cast body of plastic material or metal, open at the bottom, and including a dome portion 16, an intermediate portion having side walls 17, a rear wall 18 and a forward wall 19; and a base portion comprising lower portions of walls 17 and 18 plus a forward apron portion 20 including a wider intermediate wall 21 which is generally horizontal though slanted somewhat downwardly and forwardly, to provide a step or shelf upon which the upper portion of book 13 may be supported. A removable bottom or base plate 22 is secured to the aforesaid body so as to close the open bottom of the case. The base plate 22 carries cushioning feet 23 for supporting the machine on a table or the like.

The drive mechanism includes a motor 24 which may be a fractional horsepower motor, secured at its upper extremity to the under side of a horizontal arm 25 of a bracket 26 of L-shape. Bracket 26 may be of heavy sheet metal and includes a downwardly extending arm 27, the corner portion of the bracket having secured thereto an internally threaded sleeve 28 by means of which the bracket is mounted upon a threaded shaft 29. Shaft 29 has trunnion portions 30 and 31 journalled in bearing lugs 32 in the casing B, trunnion 30 being of reduced diameter and defining a shoulder at the end of the threaded portion of the shaft, which shoulder abuts against the adjacent lug 32. Near its end, trunnion 30 has an annular groove in which is mounted a snap ring 33 for retaining the shaft against axial displacement from the casing. In the other end of shaft 29 is an operating knob 34 which may have a knurled periphery as shown.

Figure 2:
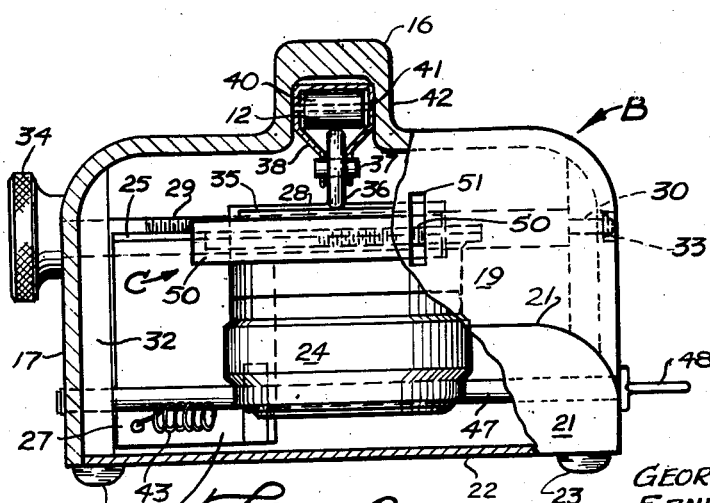
Fig. 2 is a front view of the same, with a portion of the case broken away to illustrate the internal construction thereof.

The bracket arm 25 is bifurcated (Fig. 4) the respective furcations thereof straddling the motor shaft (not shown) which projects upwardly from the top of the motor 24. Upon this projecting upper end of the motor shaft is secured a driving disc 35. A drive roller 36 is journalled on a shaft 37 between the arms of a yoke shaped bracket 38. Roller 36 has a resilient tire 39 which normally engages the upper face of drive disc 35 with a frictional engagement. Tire 39 may be of rubber, synthetic rubber or yielding plastic material having the general characteristics of rubber. The upper side of tire 39 engages, with a frictional driving engagement, against the under side of guide stem 12, the upper side of stem 12 being engaged by a pair of spaced rollers 40 journalled on pins 41 in bracket 38. Bracket 38 is secured in a fixed position within dome 16, and is securely embraced between side walls 42 thereof (Fig. 2). Pins 41 may be extended through walls 42 in order to secure bracket 38 to the dome, or any other suitable securing means may be employed. Rollers 40 press stem 12 downwardly into frictional engagement with tire 39, so that rotation received from driving disc 35 by roller 36 will be transmitted to shaft 12.

Shaft 29 provides a pivotal mounting for bracket 26, providing for swinging movement of bracket 26 from the position shown, in which drive is transmitted from disc 35 through roller 36 to line guide A, to a lowered position of arm 25 (brought about by clockwise rotation of bracket 26 around shaft 29 as viewed in Fig. 3) in which disc 35 is withdrawn from driving engagement with roller 36. The driving position is maintained by the action of a coil spring 43 acting under tension between the lower end of arm 27 and a link 44 connecting it to an adjusting screw 45. Screw 45 is received through an opening in apron member 20, has a head engaging apron member 20, and has a threaded body portion threaded into link 44, whereby rotation of the screw in one direction will draw link 44 toward it so as to increase tension upon spring 43, while rotation in the other direction will relax the tension on spring 43.

The driving position of disc 35 is determined by the engagement of the lower end of the arm 27 against a cam 46. Cam 46 is secured to a shaft 47 which extends across the base portion of casing B and is journalled in the lugs 32 thereof. One end of shaft 47 projects beyond the casing and has secured thereto an operating lever 48. By engaging lever 48 with the finger and depressing it, cam 46 will be rotated clockwise as viewed in Fig. 3, its lower extremity moving arm 27 rearwardly and thus causing bracket 26 to swing in the clockwise direction to the unclutched position.

The unclutching of the motor is utilized for allowing the line guide A to be quickly pushed back to a starting position after it has been driven the full length of a page. By simply releasing the pressure on lever 48, the driving unit is immediately brought back to the driving position by the action of spring 43.

Shaft 29 serves not only as a pivot for bracket 26, but also as a means for adjusting the bracket, and with it the motor 24 and driving disc 35, transversely of casing B. This transverse adjustment of the motor and driving disc is utilized to vary the drive ratio between disc 35 and roller 36. For example, with roller 36 engaging disc 35 just slightly to one side of the center thereof as indicated in Fig. 4, the drive to line guide A will be relatively slow. By shifting motor 24 and disc 35 in the direction indicated by arrow 49 in Fig. 4, the drive to line guide A will be speeded up. The lateral shifting movement is accomplished by the rotation of threaded shaft 29 which operates as a worm within threaded sleeve 28, causing the latter to travel longitudinally thereon.

It is to be noted that when bracket 26 is adjusted laterally by screw 29, that arm 27 will simply slide against cam 46, arm 27 being sufficiently wide to maintain engagement with cam 46 throughout the range of adjustment.

The drive ratio is indicated upon an indicator dial 50 secured to motor 24 (e. g. between the top thereof and arm 25) and travelling therewith. Indicator 50 is visible through a slot 51 in forward intermediate wall 19 of casing B and includes appropriate indicia for indicating the drive ratio as determined by the positions of the motor and drive disc in their lateral adjustment.

Stem 12 of the line guide extends through openings 52 and 53 in the dome member 16.

It will now be apparent that the invention provides a relatively simple apparatus in which a drive motor is mounted upon a shaft serving both as a pivot for allowing swinging movement of the motor for declutching purposes, and also as a means for shifting the motor laterally so as to change the drive ratio to the line guide device. It provides an arrangement in which the motor can be quickly declutched simply by depressing a clutch lever, and holding it down with one hand while the line guide is quickly returned to a starting position with the other hand. It provides an apparatus in which the drive ratio may be adjusted and may be accurately determined by an indicator constituting simply a dial member attached to the motor and moving therewith, past a sight opening in the casing. It provides an arrangement in which the camming mechanism for shifting the motor bracket to a declutched position also operates as a limiting stop for determining the proper driving position of drive disc 35 relative to drive roller 36, so that the pressure against roller 36 may not be too heavy, or such as to damage the roller or its bearings.

The invention provides an apparatus including a line guide of T-form comprising a cross head and a stem for transmitting movement from a driving unit through the cross head, the stem being firmly gripped between a driving member and idler members of the driving mechanism but being highly flexible so that the guide head may swing downwardly by gravity to rest lightly against the pages of a book, books of different thickness being accommodated by different degrees of flexing of the operating shaft. It provides an arrangement in which the guide stem will exert some lifting action against the guide head, though not enough to fully support it. Thus the guide head will rest lightly against the pages of the books, avoiding any possibility of marring or tearing the same, and yet securely holding them down. The flexibility of the guide stem also enables the operator to readily lift the guide head off a book, to declutch the driving mechanism and to quickly push the line guide member back to a starting position.

I claim:

1. In a reading pacer, a line guide member of T-form having a guide head for engaging a page of printing and a flexible stem to one end of which said guide head is secured, and drive mechanism frictionally engaging an intermediate portion of said flexible stem, said stem being adapted to freely flex to permit the guide head to rest against books of varying thickness, supported upon a fixed support.

2. In a reading pacer, a casing providing a step upon which the upper portion of a book may be rested, driving mechanism therein, a line guide member of T-form including a guide head adapted to rest upon the pages of the book, and a flexible stem to one end of which said guide head is secured, said driving mechanism including means frictionally engaging said stem for transmitting drive thereto, said stem being adapted to freely flex to allow said guide head to rest by gravity against the pages of a book supported as aforesaid.

3. In a reading pacer, a line guide member of T-form including a guide head for engaging a page of printing and a flexible stem to one end of which said guide head is secured, a rotatable friction drive member engaging one side of said stem, idler means engaging the other side of said stem to maintain engagement thereof with said drive member, and motor driven means for rotating said drive member.

4. In a reading pacer, a line guide member of T-form including a guide head member to engage a page of printing and a stem upon which said guide head is supported, transmission means for transmitting drive to said stem, a motor having a driving member adapted to transmit drive to said transmission means, means upon which said motor is mounted for swinging movement from a position in which said driving member makes driving engagement with said transmission means to a position in which said driving member is released from said driving engagement, resilient means yieldingly urging said motor toward the driving position, and a declutching actuator adapted for manual operation to remove said motor and driving member to the declutched position against the yielding resistance of said resilient means.

5. In a reading pacer, a T-shaped line guide including a guide head to engage a printed page and a stem for transmitting drive thereto, transmission means engaging said stem for transmitting longitudinal movement thereto, a motor and a driving member driven thereby, a threaded shaft upon which said motor is pivotally mounted for swinging movement from a position in which said driving member engages said transmission means to a declutched position in which said driving member is released from said transmission means, manually operable means for moving said motor to the declutched position, and means resiliently urging the motor toward the driving position, said driving member being arranged to be shifted laterally by rotation of said threaded shaft, whereby to vary the ratio of drive between said driving member and said transmission means.

6. In a reading pacer, a T-shaped line guide member including a guide head to engage a printed page to be read and a stem to one end of which said guide head is secured, a rotatable friction drive roller engaging one side of said stem for transmitting longitudinal movement thereto, idler roller means engaging the other side of the stem opposite said roller for maintaining driving engagement between the stem and said drive roller, a motor, a driving disc carried by said motor and driven thereby, a threaded shaft on which said motor is mounted for pivotal swinging movement between positions in one of which said disc frictionally engages said drive roller opposite the point of engagement thereof with said stem, and in the other of which said disc is out of driving engagement with said drive roller, and means on said motor having threaded coaction with said threaded shaft whereby rotation of said threaded shaft causes said motor and drive disc to be shifted in a direction parallel to the axis of said drive roller whereby to vary the ratio of drive between said disc and said drive roller.

7. A pacer as defined in claim 5, including an indicator dial fixed to said motor and moving therewith, and a case in which said motor is enclosed, said case having a sight opening past which said dial travels, whereby to indicate the drive ratio.

8. A pacer as defined in claim 5, including a case having a main body portion enclosing said motor and a reduced width dome having registering openings in its forward and rear walls respectively, said stem extending through said openings.

GEORGE F. J. LEHNER.
RALPH E. BROWN.
E. C. BURKHART.

REFERENCES CITED

The following references are of record in the file of this patent:

UNITED STATES PATENTS

| Number | Name | Date |
| --- | --- | --- |
| 1,587,886 | Whitmore | June 8, 1926 |
| 2,061,532 | Zenner | Nov. 17, 1936 |
| 2,078,834 | Brennan | Apr. 27, 1937 |
| 2,098,020 | Wheeler | Nov. 2, 1937 |
| 2,265,924 | Oerter | Dec. 9, 1941 |